United States Patent [19]
Hutchinson

[11] 3,984,377
[45] Oct. 5, 1976

[54] FLUOROCARBON-SUBSTITUTED POLYMERS
[75] Inventor: John Hutchinson, Runcorn, England
[73] Assignee: Imperial Chemical Industries Limited, London, England
[22] Filed: Apr. 25, 1974
[21] Appl. No.: 464,235

[30] Foreign Application Priority Data
May 10, 1973  United Kingdom............... 22355/73

[52] U.S. Cl............................ 260/59 R; 260/47 UA; 260/47 P; 260/49; 260/57 R; 428/460
[51] Int. Cl.$^2$........................ C08G 8/28; C08G 8/30
[58] Field of Search............... 260/47 UA, 59 R, 61, 260/47 D, 49, 57; 117/161 UZ, 161 L, 161 R

[56] References Cited
UNITED STATES PATENTS
3,389,094   6/1968   D'Alessandro...................... 260/2.5
3,423,335   1/1969   Phillips ................................. 260/2

Primary Examiner—Lester L. Lee
Attorney, Agent, or Firm—Cushman, Darby & Cushman

[57] ABSTRACT
A phenol-formaldehyde resin in which many hydroxyl groups are replaced by oxy-fluorocarbon groups, preferably by reaction with a tetrafluoroethylene oligomer, possesses improved electrical properties and an oil-repellent surface.

20 Claims, No Drawings

FLUOROCARBON-SUBSTITUTED POLYMERS

This invention relates to organic polymers substituted with fluorocarbon groups.

Highly-fluorinated aliphatic groups and especially perfluoroaliphatic groups are known to possess a considerable degree of oleophobic character. The presence of such groups in a molecule gives rise to remarkable surface-active effects and consequently the replacement of a hydrocarbon group in a compound by a highly-fluorinated aliphatic group produces a new compound having very different properties.

Thus according to the present invention there is provided a synthetic polymer having a plurality of repeating units, each unit comprising a homocyclic aromatic nucleus bearing a pendant oxygen substituent, at least 5% of the said oxygen substituents in the polymer each being covalently attached to an aliphatic fluorocarbon group containing from 2 to 20 carbon atoms. By pendant oxygen substituent we mean an oxygen directly attached to the nucleus which is not involved in any linkage to other repeating units of the polymer.

In the polymer structure of this invention the pendant oxygen substituents of the aromatic nucleus which are not attached to fluorocarbon groups are preferably attached to a hydrogen atom and are therefore part of a phenolic-type hydroxyl group. The number of such phenolic hydroxyl groups is preferably not greater than 70% of the total number of oxygen substituents of the aromatic nuclei in the whole polymer. When more than 30% of the hydroxyl groups in a phenolic polymer of the type defined have been replaced very significant changes in properties of the polymer are observed.

According to a preferred aspect of the invention there is provided a fluorocarbon-modified phenolic polymer having a plurality of repeating units each unit comprising a homocyclic aromatic nucleus bearing a phenolic hydroxyl group and wherein at least 30% of the phenolic oxygen atoms of the polymer are in the form of $-OR_f$ group wherein $R_f$ is an aliphatic fluorocarbon group containing from 2 to 20 carbon atoms.

In an especially preferred polymer 50–90% of the phenolic oxygen substituents are attached to a fluorocarbon group as described. It is advantageous not to replace all the phenolic hydroxyl groups; the residue of a few normal phenolic aromatic nuclei bearing phenolic hydroxyl groups is useful because further covalent links may be formed between these nuclei by means of a normal reaction with curing agents for phenolic polymers in order to produce commercially useful products.

The aliphatic fluorocarbon group is a highly-fluorinated aliphatic group containing as substituents other than fluorine not more than 2 hydrogen atoms, and the group may be branched-chain or straight-chain. The group is preferably a perfluorocarbon group which may be a perfluoroalkyl or perfluoroalkenyl group. An especially preferred group is a highly-branched perfluoroalkenyl group conveniently derived from an oligomer of tetrafluoroethylene or hexafluoropropene. The perfluorocarbon groups preferably contain from 6 to 12 carbon atoms, for example $C_6F_{13}$, $C_7F_{15}$, $C_8F_{15}$, $C_8F_{17}$, $C_{10}F_{19}$, $C_{12}F_{23}$. Examples of other fluorocarbon groups which may be used are $CF_3-$ 2- and $C_6F_{13}CH=C(CF_3)-$.

Known polymers may be modified by the introduction of fluorocarbon groups and thus produce the novel structure of the present invention. The known polymers may be natural resins or synthetic polymers, for example phenol formaldehyde or cresol formaldehyde polymers. Either "novalak" or "resole" forms of these synthetic polymers may be used and at least a portion of the phenolic hydroxyl groups reacted to form oxyfluorocarbon groups. Resole resins contain in addition to phenolic hydroxyl groups a certain number of methylol substituents on the aromatic rings and these methylol hydroxyl groups may also be replaced with oxyfluorocarbon groups. In general however the methylol groups are more difficult to replace with fluorocarbon groups but they are useful as groups from which crosslinking may take place.

In general a polymer according to this invention may be made by a process comprising the reaction of a phenolic hydroxyl group contained in the repeating units of the polymer with a fluorocarbon compound containing a group reactive to the phenate ion of the said hydroxyl group.

One preferred method of conducting the process is by the reaction of the phenolic hydroxy groups present in the polymer with a perfluoro-olefine, preferably an oligomer of tetrafluoroethylene, in the presence of an organic or inorganic base for example a tertiary amine or a carbonate or silicate of sodium or potassium. Suitable reaction systems between phenols and perfluoro-olefines have been described in our co-pending application UK application Nos. 8295/71 and 48145/71 and those reaction systems are generally applicable to the treatment of polymers containing phenolic hydroxyl groups.

The phenolic hydroxyl groups may be replaced by other reactions involving for example the reaction of acid chlorides, especially sulphonyl chlorides, of compounds containing a terminal perfluoro-aliphatic group. For example perfluoro-octanoyl chloride or perfluoro-octyl sulphonyl chloride may be reacted with a phenol formaldehyde resin and groups such as $C_7F_{15}COO-$ or $C_8F_{17}SO_2O-$ may be attached as substituents to the benzene rings. Such ester linkages, formed also by reaction of the ketene $C_6F_{13}CHCO$ with the phenolic groups, are not observed to be as stable as the ether linkages (e.g. $C_8F_{15}O-$) formed by the preferred base catalysed reactions with perfluoro-olefines described hereinbefore.

The aromatic nucleus in each unit of the polymer may be further substituted with one or more alkyl groups, preferably short alkyl groups and especially methyl groups.

In the resole type of phenol-formaldehyde or cresol-formaldehyde polymers in which the aromatic nucleus is further substituted with methylol groups the phenolic hydroxyl groups are more reactive than the methylol hydroxyl groups to perfluoro-olefines in the presence of a base. Thus in this type of polymer the methylol groups will in general be available for the formation of further linkage between aromatic nuclei even when all the phenolic hydroxyls have been replaced by $OR_f$ groups.

The fluorocarbon substituted polymers of this invention may be further reacted with other reagents, for example $POCL_3$, so that the remaining unsubstituted phenolic or methylol hydroxyl groups are converted to $OPOCl_2$ groups which may be hydrolysed to phosphate groups $-OPO_3M_2$ wherein M is hydrogen, metal or organic cationic group. Polymers having their hydroxyl groups substituted with both fluorocarbon and phosphate groups especially phosphoric acid groups (—O-

$PO_3H_2$) are useful for coating metals, in particular metal moulds, and a metal mould coated in this way has been shown to release polyurethane mouldings with great ease.

The polymers of this invention are useful for the treatment of surfaces especially porous surfaces in order to render them oleophobic or to provide lower friction or lower adhesive character for the surfaces. The polymers may be used advantageously in the treatment of leather, wood, paper, asbestos, brick and other porous surfaces of articles in domestic and industrial use.

One major use of phenol formaldehyde resins is in the production of electrical insulators of all types for example moulded plugs and sockets, circuit boards, wire sleeves and cores. Moulded articles from the polymers of the present invention i.e. polymers having a certain number of hydroxyls replaced with fluorocarbon groups show better insulating properties than those from the corresponding conventional polymers. The advantage of the insulators made from resins which include the polymer structure of this invention are more readily appreciated when high voltage insulation is required but the better properties may be demonstrated by the volume resistivity values quoted in Example 8.

The invention is illustrated by the following examples.

A typical phenol/formaldehyde novolak resin prepared from phenol and formaldehyde and found by analysis to contain one equivalent of hydroxyl in each 103 gms of resin was used as the starting material for Examples 1 to 4.

EXAMPLE 1

A mixture of a novolak phenol-formaldehyde (PF) resin (21.4g), tetrafluoroethylene (TFE)-pentamer (50g), potassium carbonate (20g) and methylethylketone (150 ml) was stirred at 35°–45° C for 7 hours. The solution was cooled, filtered and the solvent was removed using a rotary evaporator. There remained a pale yellow resinous material whose nuclear magnetic resonance spectrum showed the structure $(C_2F_5)_2C(CF_3)-C(CF_3)=C(CF_3)-$ to be present. The fluorine content of the resin was 47%.

Assuming all of the pentamer had reacted with hydroxyl groups and there was no solvent in the product, the theoretical maximum fluorine content could have been 52%. A fluorine content of 47% corresponds to approximately 36% of the OH groups being replaced by $-OC_{10}F_{19}$.

EXAMPLE 2

A reaction was carried out as described in Example 1, but using 21.4 gms of the PF resin, 10 gms TFE pentamer, 5 gms potassium carbonate and 150 mls methylethylketone. The mixture was stirred for 3½ hours at 40°–50° C. On working up, a resin was obtained whose nuclear magnetic resonance spectrum showed the presence of $(C_2F_5)_2C(CF_3)-C(CF_3)=C(CF_3)-$ and which contained 21% F. (Assuming complete reaction the fluorine content could have been as high as 23%.)

EXAMPLE 3

This reaction was carried out as described in Example 1 but using 21.4 gms PFE resin, 75 gms TFE pentamer, 20 gms potassium carbonate and 150 mls methylethylketone. The mixture was stirred at 35°–45° C for 7 hours. On working up, a resin was obtained whose nuclear magnetic resonance spectrum showed the major fluorine-containing group to be $(C_2F_5)_2C(CF_3)-C(CF_3)=C(CF_3)-$ and which contained 51% fluorine. (Using the same assumption as before, the maximum theoretical fluorine content is 58%). A fluorine content of 51% corresponds to approximately 49% of the OH groups being replaced by $OC_{10}F_{19}$.

EXAMPLE 4

An autoclave charged with methylethylketone (100 ml), novolak resin (20 gms) and sodium carbonate (42 gms) was pressurised with hexafluoropropene at 10° C. As the pressure fell, more hexafluoropropene was injected until no further pressure drop occurred. The vessel was then maintained at 45° C for 2 hours. The reaction mixture was poured into water and the organic material was extracted into ether. The ether solution was dried, filtered and after the solvent was removed using a rotary evaporator a resinous material was obtained. The nuclear magnetic resonance spectrum of the resin showed the presence of $CF_3-CF(H)-CF_2-O-$ and $CF_3-CF=CF-$(cis and trans) combined in the approximate ratio 9:4. Further study of the nuclear magnetic resonance spectrum suggested that about 25% of the aromatic rings still bore hydroxyl groups i.e. 75% of the hydroxylic protons have been replaced by $C_3F_6H-$ or $C_3F_5-$ groups.

EXAMPLE 5

A flask fitted with a vibro-stirrer was connected through a condenser to a manometer, a supply of hexafluoropropene and a vacuum pump. The flask was charged with methylethylketone (100 ml), potassium carbonate (14 gms) and a commercial novolak resin based on octyl phenol and formaldehyde sold as "Bakelite" R 17301 (11 gms). It was then pumped out and repressurised to one atmosphere with hexafluoropropene. Stirring was commenced and, as the pressure fell, hexafluoropropene was admitted to the system to maintain approximately one atmosphere. The reaction as mildly exothermic. When no further pressure drop occurred the reaction mixture was filtered and solvent was removed by distillation. There remained a resin which contained 29% fluorine and whose nuclear magnetic resonance spectrum showed the presence of $CF_3-CFH-CF_2-O-$ and $CF_3-CF=CF-O-$ groups in the approximate ratio 2:1.

EXAMPLE 6

A flask fitted with a stirrer and a reflux condenser was charged with tetrafluoroethylene pentamer (55 gms), potassium carbonate (25 gms), methylethylketone (150 ml) and Bakelite R 17301 (22 gms) and was heated at 60° C for 4 hours. After this treatment, the reaction mixture was filtered and the solvent was removed by distillation to give a resin which contained 40% fluorine and whose nuclear magnetic resonance spectrum showed the group $(C_2F_5)_2C(CF_3)-C(CF_3)-C(CF_3)=C(CF_3)-$ to be the major fluorine-containing group.

EXAMPLE 7

To 10 gms of the resin produced in Example 1 (fluorine content 47%) and pyridine (1.9 gms) in ether was added slowly and with stirring a solution of $POCl_3$ (3.75 gms) in ether. A white precipitate of pyridine hydrochloride formed immediately on addition of the oxychloride. Stirring was continued for 2 hours and then the mixture was filtered. The filtrate was then poured into water. When the exothermic reaction had subsided the mixture was extracted with ether and the ether solution was dried over magnesium sulphate, filtered and evaporated to dryness. The residue was examined by nuclear magnetic resonance which demonstrated that the hydroxyl groups in the starting material had been replaced by —O—PO(OH)$_2$ groups.

EXAMPLE 8

The product of Example 7 was tested as a coating on a metal mould in order to demonstrate the ability of the above product to release polyurethane mouldings.

Two stainless steel plates 6 × 6 inches were coated with the polymer prepared in Example 5 by spraying them with a solution in methylated spirit containing 0.5% of the polymer and 0.05% of "Manoxol" OT as a wetting agent. The plates were clamped together with a gasket separating them and a polyurethane syrup containing a conventional curing agent was poured into the space between them bounded by the gasket and allowed to set at the recommended temperature for curing. After the polyurethane had set hard the plates were separated easily and could be re-used many times for similar mouldings.

For comparison, similar stainless steel plates were coated with a commerical silicone-containing mould-release agent ("Contour" 1711) and the above experiment with a polyurethane was repeated. The plates separated easily but the surface of the polyurethane moulding produced was observed to be contaminated with silicone which prevented paint adhering to the plastic surface. The polyurethane mouldings performed with the product of Example 7 - (the substituted phenol formaldehyde resin containing fluorocarbon and phosphate substituents) as release agent could be painted easily without further cleaning and the paint adhered well.

EXAMPLE 9

To a solution of a novolak resin (10.3 gms; 1 equivalent) and pyridine (3.95 gms; 0.5 equivalent) in methylethylketone was slowly added with stirring a solution of $C_{10}F_{19}OC_6H_4SO_2Cl$ (33.6 gms, 0.5 equivalent) in methylethylketone. A precipitate formed which after 2 hours was filtered and the filtrate was evaporated to dryness. The evaporated residue was examined by infrared spectroscopy which showed a reduction in the -OH content of the resin and the presence of the fluorocarbon group $C_{10}F_{19}$.

EXAMPLE 10

The volume resistivity, and power factor of the unmodified novolak resin used for the Examples 1 to 4 were both measured and found to be $1.5 \times 10^9$ ohms cm and 0.093 respectively. The same measurements were made on the resin obtained by the procedure of Example 3 and these were $2.8 \times 10^{10}$ ohms cm and 0.014 respectively, showing an improvement in electrical insulating properties resulting from the replacement of a substantial proportion of the hydroxyl groups in the polymer by the perfluorocarbon groups.

What I claim is:

1. A synthetic polymer having a plurality of repeating units each unit comprising a homocyclic aromatic nucleus bearing a pendant oxygen substituent, this being an oxygen atom directly attached to the nucleus and not involved in any linkage to other repeating units of the polymer, at least 5% of the said oxygen substituents in the polymer being in the form of —OR$_f$ groups and R$_f$ is an aliphatic fluorocarbon group containing from 2 to 20 carbon atoms.

2. A polymer according to claim 1 wherein any pendant oxygen substituent on the aromatic nuclei not in the form of —OR$_f$ is part of a phenolic-type hydroxyl group.

3. A polymer as claimed in claim 2 wherein the number of phenolic hydroxyl groups is not greater than 70% of the total number of the said oxygen substituents in the polymer.

4. A fluorocarbon-modified phenolic polymer having a plurality of repeating units each unit comprising a homocyclic aromatic nucleus bearing a phenolic hydroxyl group and wherein at least 30% of the phenolic oxygen atoms of the polymer are in the form of —OR$_f$ groups where R$_f$ is an aliphatic fluorocarbon group, containing from 2 to 20 carbon atoms.

5. A polymer according to claim 4 wherein 50 to 90% of the phenolic oxygen atoms are in the form of OR$_f$ groups.

6. A polymer according to claim 1 wherein the aromatic nucleus is a benzene nucleus.

7. A polymer according to claim 1 wherein each repeating unit also comprises a single methylene group forming a link between the aromatic nuclei.

8. A polymer according to claim 7 which is a condensation product of formaldehyde with a phenol, the hydrogen atoms of a proportion of the hydroxyl groups of the phenol being subsequently substituted with fluorocarbon groups.

9. A polymer according to claim 8 wherein the phenol is phenol itself.

10. A polymer according to claim 8 wherein the phenol is ortho-, meta- or para-cresol or a mixture of any of these isomers.

11. A polymer according to claim 1 wherein the fluorocarbon group is a perfluorocarbon group.

12. A polymer according to claim 11 wherein the perfluorocarbon group is a branched perfluoroalkenyl group.

13. A polymer according to claim 12 wherein the branched perfluoroalkenyl group is an oligomer of tetrafluoroethylene or hexafluoropropane.

14. A polymer according to claim 11 wherein the perfluorocarbon group contains from 6 to 12 carbon atoms.

15. A process for producing a synthetic polymer which comprises reacting a polymer having as repeating units a homocyclic aromatic nucleus bearing a pendant phenolic hydroxylic group with an aliphatic fluorocarbon compound having from 2 to 20 carbon atoms and containing a fluorine atom or an acid chloride group reactive with the phenolic hydroxyl groups of the polymer, such that at least 5% of the phenolic hydroxyl groups of the polymer are converted into —OR$_f$ groups where R$_f$ is an aliphatic fluorocarbon groups.

16. A process according to claim 14 wherein the perfluoro-olefine is a branched internally-unsaturated oligomer of tetrafluoroethylene or hexafluoropropene having from 6 to 12 carbon atoms.

17. A process according to claim 16 wherein the reaction is effected in the presence of a basic compound selected from the group consisting of a tertiary amine or a carbonate or silicate of sodium or potassium.

18. A fluorocarbon-modified phenolic polymer having a plurality of repeating units, each unit comprising a methylene group and a benzene nucleus bearing a phenolic hydroxyl group wherein at least 30% of the phenolic oxygen atoms of the polymer are in the form of $-OR_f$ groups where $R_f$ is an aliphatic perfluorocarbon group, containing from 2 to 20 carbon atoms.

19. A polymer according to claim 1 wherein phenolic hydroxyl groups on the aromatic nuclei are substituted with phosphoric acid or metal phosphate groups by reacting said polymer with $POCl_3$ so as to convert unsubstituted phenolic or methylol groups to $-OPOCl_2$ groups and hydrolyzing the polymer.

20. A process according to claim 15 wherein the fluorocarbon compound is a perfluoroolefine.

* * * * *